3,427,120
PRODUCING METHOD OF CARBON OR
CARBONACEOUS MATERIAL
Akio Shindo, Oyodo-ku, Osaka, Rokuro Fujii, Toyonaka-shi, and Isao Souma, Ibaraki-shi, Osaka-fu, Japan, assignors to Agency of Industrial Science and Technology, Tokyo, Japan, a corporation of Japan
No Drawing. Filed Dec. 17, 1963, Ser. No. 331,095
Claims priority, application Japan, Dec. 21, 1962, 37/56,270
U.S. Cl. 8—115.5        2 Claims
Int. Cl. C01b 31/07; C23c 9/08

The present invention relates to methods of producing carbon or carbonaceous products by heat-treating polyvinyl alcohol materials, meaning those containing polyvinyl alcohol and/or its derivatives to higher temperatures after preoxidation thereof. By "carbonaceous products" are meant blackened polymer materials decomposed at lower temperatures and having relatively lower values of carbon content. "Carbon products" means products obtained by heat-treating polymer materials containing polyvinyl alcohol and/or related materials thereof to relatively higher temperatures and having higher values of carbon content.

The industrial uses of the new products obtained by the methods of this invention are, for example, filters for acids, alkalis and high temperature gases, fillers for plastics, and electrically heating elements.

It is one object of the present invention to provide carbonaceous or carbon products having shapes predetermined prior to heat-treatment such as, for example, fibers, fabrics, films and powders, and having properties such as, heat resistance, electrical conductivity, good mechanical strength, chemical inertness or flexibility.

According to the present invention, when an original polymer material is a filament, a carbonaceous or carbon product obtained also is a filament.

When the original materials have shapes such as fibers, films, or fine spherical particles of a diameter or thickness less than several microns, in accordance with this invention, the mechanical strength of the products is very great. For example, the carbon filament obtained in accordance with the present invention by heating polyvinyl alcohol fiber of denier 3 to 1000° C. after preoxidation have exhibited a breaking strength of 5800 kg. per cm.$^2$.

In accordance with the present invention, polymer materials containing polyvinyl alcohol or derivatives thereof are heat-treated in air or in an oxidizing atmosphere at relatively low temperatures, near or below the decomposition points, prior to heat-treatment to higher temperatures for carbonization.

The preferred method of achieving the thermal modification or carbonization of the polymer materials containing polyvinyl alcohol or relatives thereof comprises heating the materials in a halogen atmosphere in the temperature range below 400° C., or heating the materials after treatment with halogens or halogen compounds at room temperature. The halogen compounds which may be used in the present invention are those generally used as oxidizing reagents.

The preferred original polymer polyvinyl alcohol materials of the present invention include polyvinyl alcohol, esterified polymers thereof, formalized polymers thereof, acetalized polymers thereof, ketalized polymers, and cross-linked polyvinyl alcohols. Furthermore, aminoacetalized polyvinyl alcohol may be applicable.

When the polymer materials are heated in air or any other oxidizing atmosphere at temperatures below their decomposition points for periods of time sufficient to result in carbon products having excellent mechanical properties after carbonization treatment, its decomposition reaction proceeding gradually, a portion of hydrogen or oxygen contained therein is eliminated, whereby scission of main chains is not only checked remarkably but also the mutual cross-linking between neighboring carbon chains is formed. The polymer materials thermally modified in this way still retain their shapes even at temperatures above the decomposition points or the melting point, though some dimensional shrinkage occurs inevitably. In addition, such preoxidation treatments cause an increase in carbon yield and in mechanical strength to the carbonaceous or carbon product after heat-treatment to a higher temperature in an inert atmosphere or in a vacuum.

In carrying out the preoxidation treatment procedure of the present invention, the original polymer materials are heated in an oxidizing atmosphere. As the preoxidizing atmosphere, halogen gases are preferred. In the preoxidation treatment with air, the polymer materials are heated at a temperature below decomposition points or melting points thereof.

In practice, when a polyvinyl alcohol material, or a partially esterified polyvinyl alcohol polymer material is heat-treated in air, its decomposition reaction proceeds at a moderate rate near 200° C. In the heat-treatment of the preoxidized material at a higher temperature in an atmosphere of nitrogen, its dehydrogenation reaction remarkably proceeds in the temperature range from 250° C. to 400° C., and the product obtained in this heat-treatment temperature range exhibits fireproof properties. When the blackened polymer materials, in which cross-link structure is formed, are heat-treated in a vacuum or in an atmosphere of lower pressure at a higher temperature, the carbon yield may be further increased in such a way that carbon is deposited within the fine pores of the material, and volatile matter which has been already evolved being decomposed. Such an increase of carbon yield also is effective in increasing the mechanical strength of the product.

In view of the experimental results obtained, the preoxidized polymer materials must be heated at a lower rate of rising temperature, because a heat-treatment at a higher rate of rising temperature, especially at a temperature between 250° C. and about 600° C., tends to cause a disruption of cross-link structure formed in the material, whereby the product would either change its shape or the carbon yield become lower. In carrying out the procedure of carbonization treatment, the preoxidized materials may be heated in an inert atmosphere in any suitable type heating chamber. Several stages of raising the temperature of preoxidized materials may be employed in the carbonization treatment of the present invention.

In accordance with the present invention, the carbon products having predetermined shapes, such as, for example, fibers, fabrics, film, fine spherical particles, also can be further heat-treated to a temperature between 1000° C. and 3000° C.

In order to obtain a higher yield of carbon or carbonaceous material, a small amount of a catalytic agent such as, for example, iron compound and a halide of the transition metals may be added to the carbonizing atmosphere, the oxidizing atmosphere, or the polymer materials. Flame retardants such as, for example, diammonium phosphate and borax also may be added to the polymer materials prior to preoxidation or carbonization treatment, although the present invention is not limited thereto.

This invention is further illustrated, but not limited thereto, by the following examples:

Example 1

A continuous filament polyvinyl alcohol fiber, having a denier of 2 and a length of 20 cm., weighing 10 g. is heated at 200° C. in air for 16 hours. The fiber discolored into a blackish-brown and is placed in a quartz-glass tube in an electric furnace, and the temperature of this tube is raised gradually to 1000° C. in a nitrogen atmosphere at atmospheric pressure at a rate of 10° C. per hour up to 700° C. and at a rate of 50° C. per hour from 700° C. to 1000° C. A fibrous carbon product, having a carbon yield of 34%, is obtained. A quantity of 3 g. of the 1000° C. fibrous carbon is further heated in a kryptol furnace from 1000° C. to 2500° C. over a period of 2 hours, whereby fibrous graphite is obtained. The fibrous carbon product exhibits a breaking tensile strength of 5300 kg. per cm.$^2$, and a moderate flexibility meeting industrial needs. The graphite fiber product exhibits 6,200 kg. per cm.$^2$.

Example 2

A quantity of 10 g. of the same polyvinyl alcohol fiber as in Example 1 is heated in air at 180° for 15 hours. The fiber product obtained is woven into a piece of cloth of 3 cm. in width by 12 cm. in length. The cloth is further heated in air at 180° C. for 5 hours. Under the same conditions as in Example 1, the cloth is further heated to 1000° C. A carbon cloth having a width of 2.5 cm. and a length of 10 cm. is obtained and exhibits moderate flexibility to meet industrial requirements.

The preferred method in accordance with the invention of achieving preoxidation prior to carbonization treatment to obtain carbon products having excellent mechanical properties comprises treating the polymer material with halogen materials, that is a halogen and halogen compound, for example, gaseous chlorine, gaseous bromine, gaseous iodine, respective solutions thereof, phosphorus pentachloride, and sulfuryl bromide. As a starting material in this method of the present invention a partially chloracetalized polyvinyl alcohol polymer material with monochloracetaldehyde also is applicable. In the preoxidation treatment with halogen of the present invention, the polymer materials may be heated in an atmosphere containing halogen gases at a temperature below 400° C.

The polymer materials preoxidized with an atmosphere containing halogen gases are carbonized by increasing the temperature in an inert atmosphere for carbonization of the polymer materials preoxidized with air.

When a polyvinyl alcohol polymer material is treated with a halogen or halogen compound, in accordance with the method of the present invention, one portion of hydrogen contained therein is eliminated, and another portion of hydrogen is exchanged by the halogen. When the polymer material treated with halogen is heated, a portion of hydrogen still contained therein is eliminated by combining with halogen added to the polymer, and another portion of hydrogen is evolved as water vapor combining with oxygen contained in the material, in the range of relatively low temperatures. The halogenated products carbonized as described above still remain in their same shapes as before the carbonization treatment, though some extent of shrinkage in size is inevitable.

For example, a brominated polyvinyl alcohol material evolves as a hydrogen bromide or water, a fairly large amount of hydrogen and oxygen contained therein near 130° C., and changes in color to black. In the case of continuous filament yarns and fabrics, it is desirable that in the temperature range near this temperature range the materials are heat-treated, holding under moderate tension, because some extent of shrinkage is accompanied by evolution of decomposition gases.

Further, the rate of temperature rise of the heat-treatment is desirably under 500° C. per hour in the temperature range below 700° C.

For purpose of illustration, but not limited thereto in any way, the method of the present invention will now be illustrated by the following example.

Example 3

A quantity of 2.5 g. of polyvinyl alcohol fiber, having a denier of 2, is reacted with a saturated vapor of bromine containing a small amount of iodine vapor at room temperature for two days. The fiber discolors into yellowish-brown and is heated to 800° C. in an atmosphere of nitrogen at a rate of temperature rise of 5° C. per hour up to 500° C. and at a rate of 10° C. per hour in the range between 500° C. to 800° C. The fiber product obtained exhibits a shrinkage in length of 40% and a carbon yield of 41%. The product also exhibits a breaking strength of 2400 kg. per cm.$^2$ and sufficient flexibility to meet industrial requirements.

While we have disclosed several embodiments of the present invention, it is to be understood that these embodiments are given by example only and not in a limiting sense, the scope of the present invention being determined by the objects and the claims.

What is claimed is:

1. A method of producing carbonaceous or carbon products that substantially retain their original shapes comprising treating polyvinyl alcohol materials in the form of fibers, fabrics, films, fine spherical particles or filaments by oxidizing said polyvinyl alcohol materials in air at a temperature between about 180° C. to about 200° C. producing a blackish-brownish product, said heating step is performed in a nitrogen atmosphere at an increasing temperature at a rate of about 10° C. per hour from a temperature of above 250° C. to about 700° C. and further heating in a nitrogen atmosphere at an increasing temperature of about 50° C. per hour from a temperature of about 700° C. to about 1000° C. to produce carbon.

2. The method as set forth in claim 1 further comprising the subsequent step of heating in a nitrogen atmosphere from about 1000° C. to about 2500° C. to produce graphite.

References Cited

UNITED STATES PATENTS 3,050,907  8/1962  Hicks et al.
3,258,363  6/1966  Lieb.

J. TRAVIS BROWN, *Primary Examiner.*

H. W. WOLMAN, *Assistant Examiner.*

U.S. Cl. X.R.

23—209.1, 209.2, 209.4, 209.6; 117—46